United States Patent
Cheng Tam et al.

(10) Patent No.: US 7,950,158 B2
(45) Date of Patent: May 31, 2011

(54) METHOD AND APPARATUS FOR MEASURING THE INTERIOR DIMENSIONS OF A GLOVE

(75) Inventors: Choi Kem Susan Cheng Tam, Hong Kong (CN); Ping Man Tam, Hong Kong (CN)

(73) Assignee: Keystone Ventures Limited, Hong Kong (HK)

( * ) Notice: Subject to any disclaimer, the term of this patent is extended or adjusted under 35 U.S.C. 154(b) by 0 days.

(21) Appl. No.: 12/699,775

(22) Filed: Feb. 3, 2010

(65) Prior Publication Data

US 2010/0192394 A1 Aug. 5, 2010

Related U.S. Application Data

(60) Provisional application No. 61/149,559, filed on Feb. 3, 2009, provisional application No. 61/149,866, filed on Feb. 4, 2009.

(51) Int. Cl.
*A41H 3/00* (2006.01)
*G01B 5/00* (2006.01)

(52) U.S. Cl. ............... 33/2 R; 33/542; 33/551; 33/17 R (58) Field of Classification Search .................. 33/2 R, 33/17 R, 542, 545, 549, 551, 552, 553, 554, 33/555
See application file for complete search history.

(56) References Cited

U.S. PATENT DOCUMENTS

| | | | | |
|---|---|---|---|---|
| 1,427,419 A * | 8/1922 | Ruddell | ............................ | 33/12 |
| 1,997,920 A * | 4/1935 | Bliss | .............................. | 33/2 R |
| 2,250,711 A * | 7/1941 | Johanson et al. | ............... | 33/2 R |
| 4,897,924 A * | 2/1990 | Tepley | ............................ | 33/2 R |
| 6,360,450 B1 * | 3/2002 | Turner | ........................... | 33/542 |
| 6,948,258 B2 * | 9/2005 | Coulombe | ...................... | 33/542 |
| 2003/0056384 A1 * | 3/2003 | Masley | ........................... | 33/512 |
| 2003/0126755 A1 * | 7/2003 | McGorry et al. | ............... | 33/512 |
| 2003/0221327 A1 * | 12/2003 | Bonzagni | ......................... | 33/512 |
| 2005/0160613 A1 * | 7/2005 | Haidler et al. | .................. | 33/542 |
| 2010/0005676 A1 * | 1/2010 | Fujikawa et al. | ............... | 33/542 |

* cited by examiner

*Primary Examiner* — G. Bradley Bennett
(74) *Attorney, Agent, or Firm* — Sheridan Ross P.C.

(57) ABSTRACT

A device and method for measuring the interior dimensions of a glove is provided. The internal glove sizing device disclosed may be used for quickly and automatically measuring the interior dimensions of a glove during and/or after manufacturing so that quality control personnel and customers can verify glove compliance with certain specifications and to ensure quality control.

20 Claims, 11 Drawing Sheets

METHOD AND APPARATUS FOR MEASURING THE INTERIOR DIMENSIONS OF A GLOVE

CROSS REFERENCE TO RELATED APPLICATION

This application claims the benefit of U.S. Provisional Patent Application Ser. Nos. 61/149,559 and 61/149,866 filed Feb. 3, 2009 and Feb. 4, 2009, respectively, which are incorporated by reference in their entirety herein.

FIELD OF THE INVENTION

Embodiments of the present invention are generally related to devices and systems for measuring the internal dimensions of a glove. More specifically, one embodiment of the present invention employs a glove sizing device for accurately and repeatedly measuring the interior dimensions of a glove during and/or after the manufacturing processes so that manufactures, retailers and customers can verify that the glove dimensions comply with predetermined specifications.

BACKGROUND

Gloves are manufactured all over the world, including the United States, China, Europe, East Asia, and Canada, by many glove companies. Moreover, innumerable styles/types of gloves, mittens and other hand coverings are manufactured, including commercial, industrial, and safety gloves, such as, military, fireman, and welder's gloves, and sport and recreational gloves, used for skiing, snowboarding, mountaineering, cycling, golf, baseball, scuba diving, hunting, sky diving, spelunking, gardening etc (hereinafter collectively referred to as a "glove"). In the glove manufacturing industry it is becoming increasingly important to ensure that manufactured gloves meet certain specifications as there are a number of different standards relating to gloves, including sizing and other health and safety aspects.

The importance of product verification has long been recognized, particularly in the fields of manufacturing, testing, and quality control. It is often necessary or desirable for glove manufacturers to ensure that manufactured gloves comply with customer specifications and/or with industry/regulatory standards. However, the glove dimension verification process is complicated by the fact that one glove factory likely produces many different sizes and styles of gloves for many different companies. Further, the thickness and stretchability of different materials may vary considerably, thus making the process of obtaining precision internal measurements more difficult. Thus, it is important to provide a device for measuring dimensions of a glove which is capable of quickly and accurately measuring many different sizes and styles of gloves, and to demonstrate repeatability and quality control in manufacturing.

Quality control and product verification also have a dramatic impact on a manufacturer's sales and revenue. It is critical for a manufacturer to quantitatively establish product compliance and/or tolerance levels in order to attract, maintain, and satisfy customers. It is also critical for a manufacturer to demonstrate that a finished glove is as ordered and that it complies with all product specifications. As such, it is often necessary or desirable to, however, to allow quality control personnel and/or customers to quickly and reliably verify product compliance with glove specifications.

The difficulty with product verification is exacerbated by the fact that most garments, especially gloves, are hand-sewn. The dimensions of hand-sewn gloves have the potential to vary greatly because different individuals sew the gloves. This is problematic because glove manufacturers need to be able to verify and ensure that the gloves are the same size and meet the same specifications. Product compliance and verification is also important because consumer comfort depends on a glove fitting properly. Thus, it would be advantageous to provide an internal glove sizing device that can quickly and accurately determine whether a glove meets certain product specifications.

FIGS. 1-7 show various prior art devices that have attempted to measure dimensions of a glove. The prior art glove measuring tools have a number of disadvantages. For example, conventional glove measuring tools require a person to manually measure each glove in order to ascertain whether it meets the product specification. As a result, product verification is imprecise and inaccurate because each person may read the measurements differently or may measure the glove at different locations. Thus, it is important to provide a glove sizing device which increases the reliability of the verification process by reducing and/or eliminating human discrepancy and/or error.

Additionally, because a person must manually record the individual measurements of each glove, typical glove sizing tools are labor intensive and the verification process is time consuming. This is undesirable if the manufacturer wants to reduce time and costs. Therefore, it is desirable to provide a system for measuring glove dimensions which quickly and cost effectively verifies that the glove complies with specific product specifications.

Prior art glove sizing devices have conventionally been designed to measure external dimensions and provide limited information regarding internal compliance with glove specifications. For example, glove sizing tools typically measure the external circumference and/or length. However, many glove specifications are made with respect to internal dimensions. Depending on the thickness and style, it is difficult if not impossible to accurately measure and verify the internal dimensions of a glove using conventional means.

Some glove sizing tools have attempted to measure internal glove dimensions; however, such tools typically are manual, time consuming, and inaccurate. For example, in the prior art device shown in FIGS. 1 and 2, there is no substantive standard that can be employed to determine and/or verify how hard to stretch the glove, how far to insert the measuring device into the glove, etc. Thus, it would be advantageous to have a device for measuring the internal dimensions of a glove that is automated, quick, and accurate.

Moreover, typical glove sizing tools do not account for the type of material used. Gloves are manufactured from many different types of materials, including cloth, fabric, knitted or felted wool, leather, cashmere, nylon, polyester, fleece, spandex, polyurethane, rubber, latex, and neoprene. Conventional glove sizing tools are typically made to work only for one particular type of material and are unable to account for different glove materials. This is undesirable because one manufacturing center may produce gloves made from many different materials, such as, leather gloves, wool gloves, textile gloves, etc. Because different materials stretch differently, it is difficult if not impossible to accurately verify the glove's actual dimensions without accounting for material. Thus, it would be beneficial to have a glove measuring system which accounts for the type of material used to make the glove.

Thus, there is a long felt but unsolved need for a measuring device that avoids the above-mentioned deficiencies of the prior art and that is capable of quickly and accurately measuring and verifying the internal dimensions of a variety of sizes and styles of gloves.

SUMMARY OF THE INVENTION

It is one aspect of the present invention to provide a device for measuring the internal dimensions of a garment. The sizing device of one embodiment of the present invention is capable of measuring the internal dimensions of a glove. More specifically, the internal glove sizing device of one embodiment of the present invention provides a measuring rod or caliper that is capable of measuring the internal width of a glove. The device of one embodiment of the present invention is also capable of measuring additional internal dimensions of the glove, including the circumference of the palm, the length and width of each digit tube, and the finger curve angle. It is envisioned that the measuring device be configured to measure other internal dimensions of a glove or other garment or article of clothing, including hats and socks.

It is another aspect of the present invention to provide a device for measuring the internal dimensions of a glove having a measuring rod and a housing. The measuring rod includes two vertical members that move laterally apart from each other and expand the glove until a pre-set load or tension is reached. Once the appropriate tension is reached, a measurement is taken to determine an internal dimension of the glove. The housing is also capable of displaying the measured internal dimension.

In another aspect of the present invention a glove sizing device adapted to measure at least one internal dimension of a glove is provided. The glove sizing device comprises means for retaining a glove in a predetermined position, means for measurement which is adapted for insertion into a predetermined portion of a glove, means for recording at least one internal measurement; and means for displaying at least one internal measurement It is yet another aspect of the present invention to provide a method for measuring an internal dimension of a glove. More specifically, the method for measuring an internal dimension of a glove of one embodiment of the present invention includes a mechanism for retaining a glove's position, measuring an internal glove dimension, recording the internal glove dimension, displaying the internal glove dimension, and printing the internal glove dimension. The method for measuring an internal dimension of a glove is accomplished by first retaining a glove and inserting a measuring device into the glove. A predetermined load or tension is then applied to the glove and an internal measurement is obtained. The measurement is then recorded, displayed, and printed.

In yet another aspect of the present invention a method of measuring at least one internal dimension of a glove is provided. The method comprises the steps of providing a mechanism to secure a glove in a substantially stable position, inserting a measuring device into an internal portion of the glove to a predetermined position, measuring at least one predetermined location within the glove, and displaying a dimension of the predetermined location within the glove.

Another aspect of the present invention is to provide means to compare an obtained glove dimension to a database of information to determine if the dimension is within an acceptable tolerance. More particularly, an operator is able to input or upload one or more databases having glove dimension information. The operator can then compare an internal dimension of a glove with a database(s) to determine whether the dimension is within a predetermined tolerance or limit.

In another aspect of the present invention, operators can input data in order to verify the dimensions of custom gloves. In particular, an operator is able to input dimension(s) of a customer's hands. Using that information, the operator can then compare the glove's internal dimension's with that of the customer to verify the size and fit of custom gloves.

In yet another aspect of the present invention, a glove may be repeatedly tested in order to verify and report glove characteristics, such as durability and resiliency. In different testing scenarios, an operator may apply a predetermined amount of force to the glove for a predetermined number of times in order to test the glove for quality control, product verification, and safety purposes.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description given below, serve to explain the principles of these inventions.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

To assist in the understanding of the present invention the following list of components and associated numbering found in the drawings is provided herein:

| Component | # |
|---|---|
| Glove | 2 |
| Palm width | 6 |
| Finger length | 10 |
| Finger/digit tube width | 14 |
| Thumb length | 18 |
| Internal glove sizing device | 22 |
| Measuring rod | 26 |
| Housing | 30 |
| Vertical members | 34a |
| Vertical members | 34b |
| Power On button | 38 |
| Power cable | 42 |
| Power Off button | 46 |
| Adjusting knob | 50 |
| Load unit | 54 |
| Load setting switch | 55 |
| Kilogram (kg) indicator button | 58 |
| Pound (lb) indicator button | 62 |
| Length unit | 66 |
| Centimeter (cm) indicator button | 70 |
| Inch (in) indicator button | 74 |
| Load display | 78 |
| Length display | 82 |
| Hold knob | 86 |
| Start button | 90 |
| Reset button | 94 |
| Top of measuring rod | 98 |
| Flat head | 102 |
| Thin sheet | 106 |
| Finger test rod | 110 |
| Vertical components | 114a |
| Vertical components | 114b |

DETAILED DESCRIPTION

Figure 1:
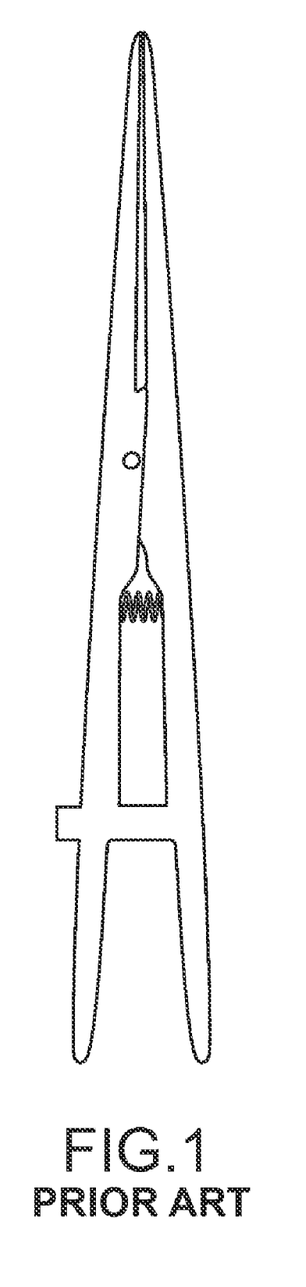
FIG. 1 is a front perspective view of a prior art glove sizing device.
Figure 2:
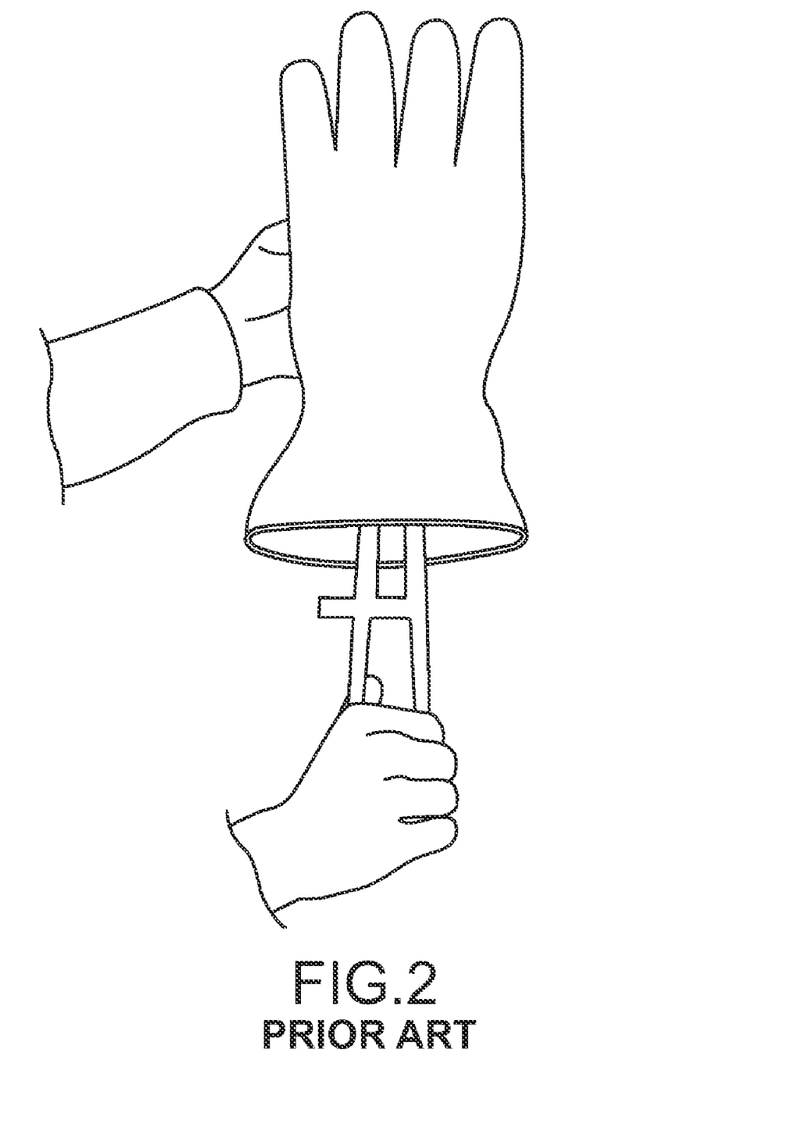
FIG. 2 is a front perspective view of the prior art device of FIG. 1, showing an operator positioning a glove thereon for measurement.
Figure 3:
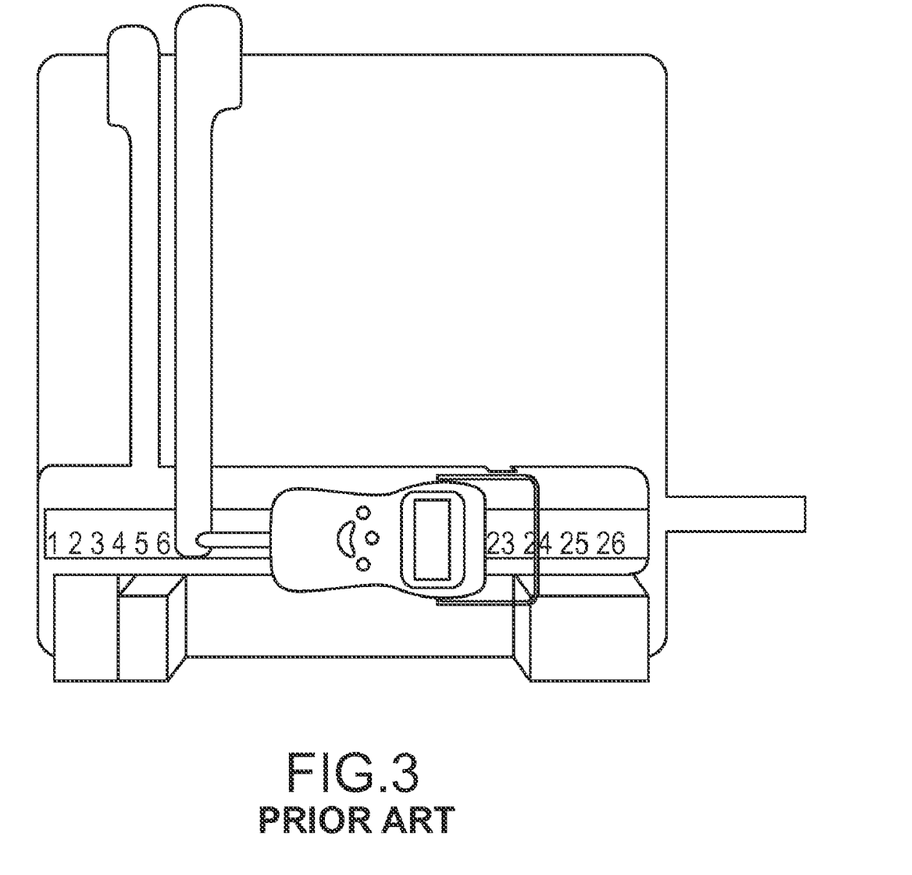
FIG. 3 is a front perspective view of another prior art glove sizing device.
Figure 4:
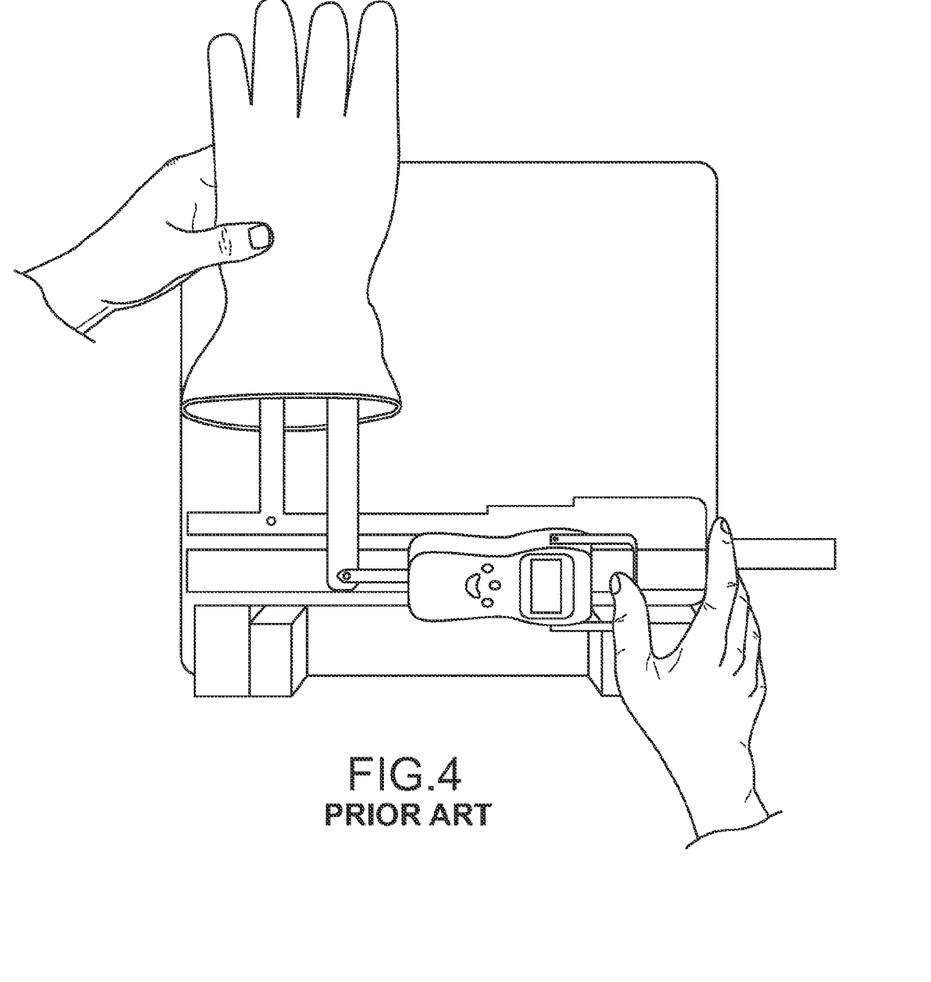
FIG. 4 is a front perspective view of the prior art device of FIG. 3, showing an operator positioning a glove thereon for measurement.
Figure 5:
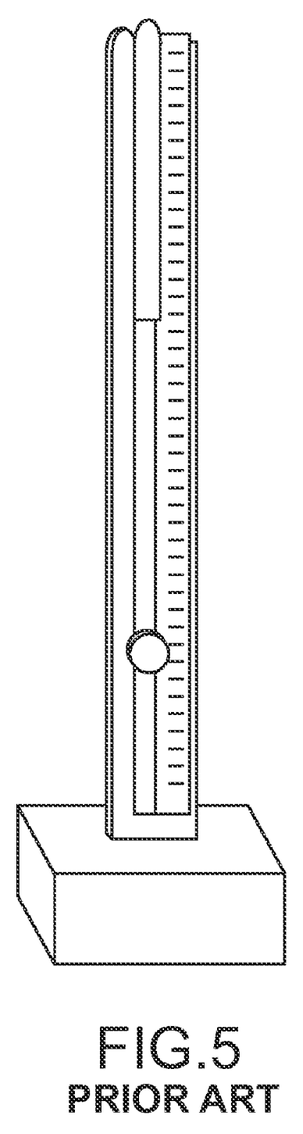
FIG. 5 is a front perspective view of another prior art glove sizing device.
Figure 6:
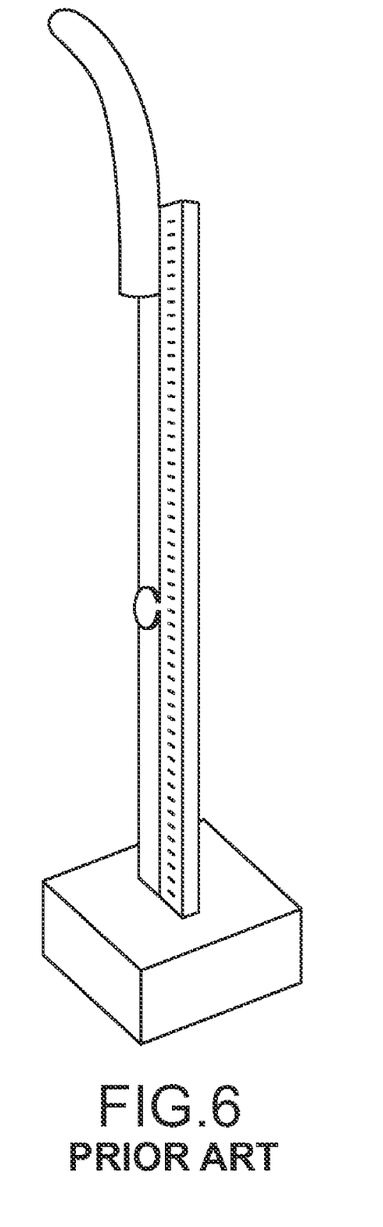
FIG. 6 is a side perspective view of the prior art device of FIG. 5.
Figure 7:
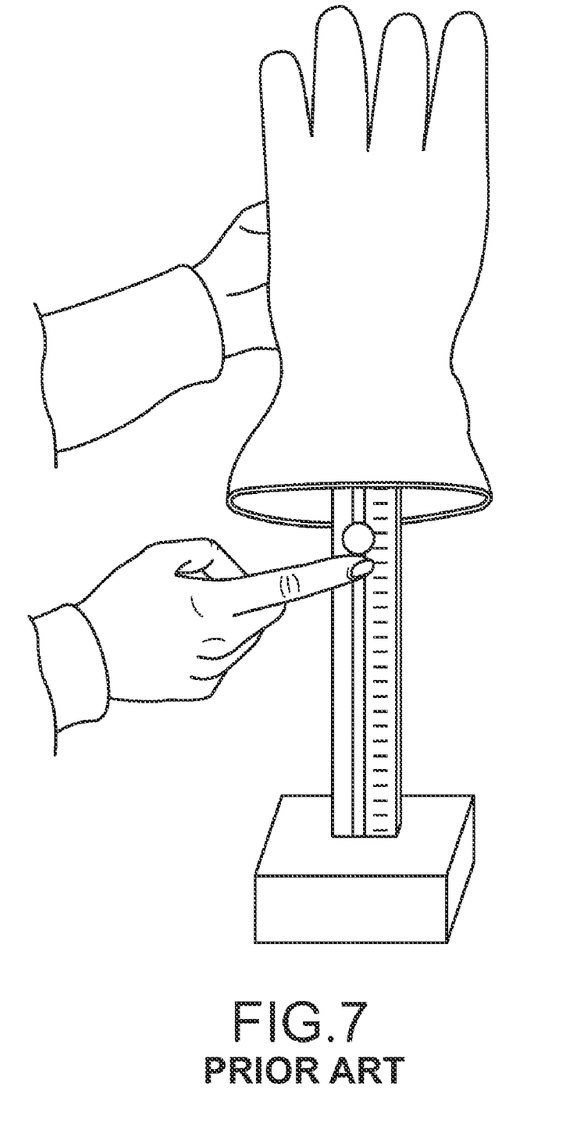
FIG. 7 is a front perspective view of the prior art device of FIG. 5, showing an operator positioning a glove thereon for measurement.
Figure 8:
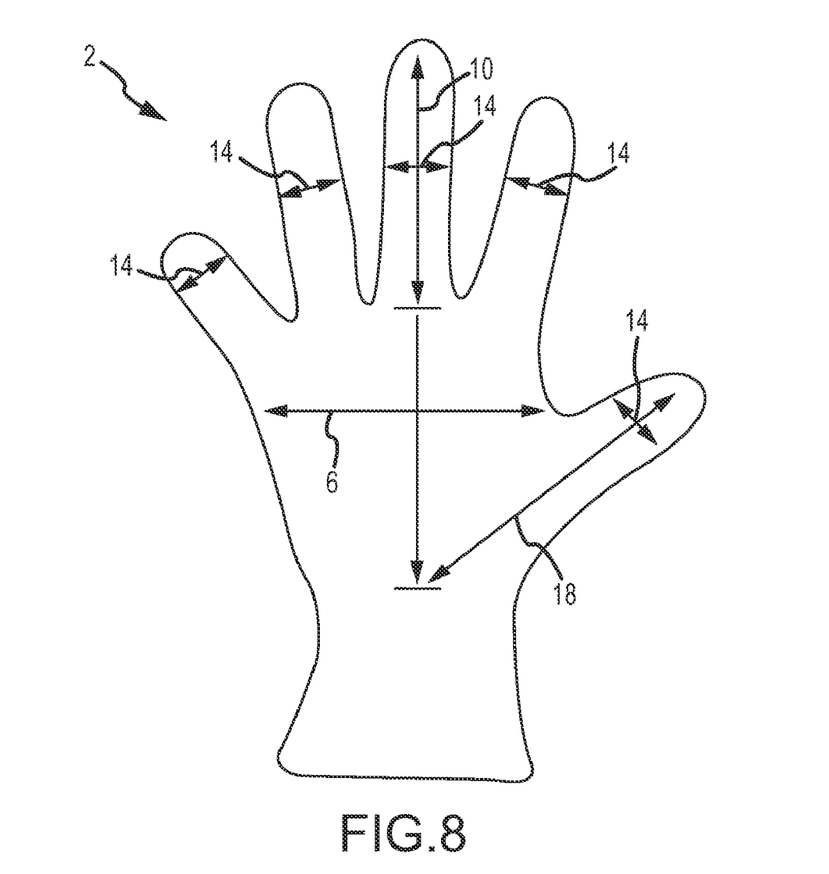
FIG. 8 is a top view of a glove showing different internal dimensions.

Referring now to FIG. 8, different dimensions of a glove 2 are shown. As used herein, the term "glove" includes but is not limited to mittens, safety gloves, commercial and industrial gloves, sport and recreational gloves, fashion gloves, and variations thereof, such as, fingerless or half-finger gloves, thumb-less gloves, wrist, elbow, and full-length gloves, scratch mittens, other hand coverings for warmth/protection, and other garments for covering at least a portion of a hand or other appendage. Glove specifications typically specify the internal dimensions that a particular glove 2 must meet. For example, palm width 6 and finger length 10 are often important internal glove dimensions. Typically, palm width 6 is measured along the widest part of the palm and finger length 10 is measured from the top of the middle finger to the top of the palm. Palm circumference can further be determined once the palm width 6 is known. Because gloves 2 are typically sized depending on palm width 6 or circumference and/or finger length 10 these dimensions are critical in manufacturing. Moreover, the width of each finger tube 14 (thumb, index, middle, ring, and little/pinky finger) and thumb length 18 are also important dimensions in glove sizing. As the demand for ergonomic gloves rises, a finger curve angle (not shown) is also becoming an important internal glove dimension. Therefore, embodiments of the present invention are adapted to measure these various internal dimensions. More specifically, the internal glove sizing device 22 of one embodiment of the present invention measures a glove's palm width 6 and digit or finger tube width 14. One skilled in the art will appreciate that many internal and other dimensions may be measured utilizing the present invention depending on a variety of factors, such as the client needs, glove aesthetics, cost, material, etc.

Figure 9:
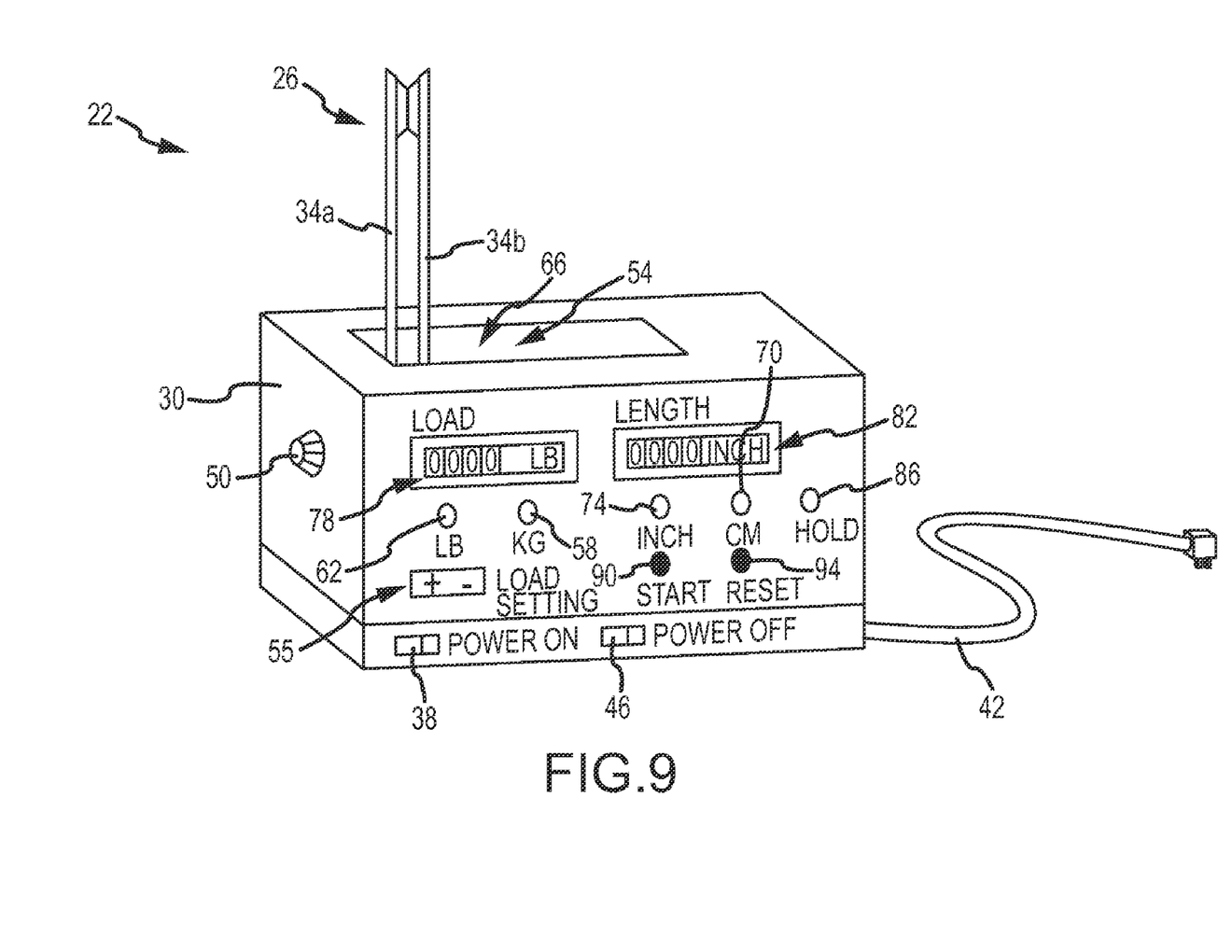
FIG. 9 is a front perspective view of an internal glove sizing device of one embodiment of the present invention.

Referring now to FIG. 9, an internal glove sizing device 22 of one embodiment of the present invention is shown. In one embodiment, the internal glove sizing device 22 is used to measure the palm width 6 of a glove 2. Embodiments of the present invention also measure a plurality of internal glove dimensions, such as finger length 10, finger tube widths 14, thumb length 18, and finger curve angle (not shown). It is envisioned that embodiments of the present invention be integrated into existing quality control and testing procedures at glove manufacturing facilities.

In one embodiment of the present invention, the internal glove sizing device 22 comprises a measuring rod 26 or caliper interconnected to a housing 30. In order to obtain internal glove measurements, a glove 2 is inserted onto the measuring rod 26. Alternatively, the measuring rod 26 may be inserted into the glove 2. The measuring rod 26 is comprised of two vertical members 34a and 34b. In one embodiment, both vertical members 34a and 34b are laterally moveable relative to one another. The moveable vertical members 34a and 34b move away from one another as a load is applied and until a certain tension or load is reached in order to measure an internal dimension. An internal width dimension may be determined by measuring the horizontal distance between the two vertical members 34a and 34b. In embodiments of the present invention, the means for measurement include a length measuring device such as, a plurality of rods, ruler, protractor, caliper, tape measure, gauge, load cell, strain gauge, laser, optical sensor, etc. One skilled in the art will appreciate that any length measuring instrument/device may be employed by the internal glove sizing device 22. One of skill in the art will also appreciate that the internal glove measurement may be obtained by manual or automated devices/instruments.

In another embodiment (not shown), one vertical member of the measuring rod is stationary and the other vertical member is moveable. In this embodiment, the vertical members are initially positioned adjacent to one another and the bottom end the vertical rods are pivotally connected. When a predetermined load is applied to the glove, the moveable vertical member rotates away at some angle of rotation from the stationary vertical member. Once the predetermined load has been applied, an internal glove measurement may be obtained by calculating the horizontal distance between the top ends of the vertical members. One skilled in the art will appreciate that many angle measuring devices/instruments, such as a protractor, may be utilized to measure the angle of rotation between the two vertical members. Once the angle of rotation between the two vertical members is known, the horizontal distance between the top ends of the vertical members may be calculated using geometry because the length of the vertical members is known. Again, one of skill in the art will appreciate that the angle, horizontal length, and other internal measurements of the glove may be obtained by manual or automated devices/instruments.

Figure 10:
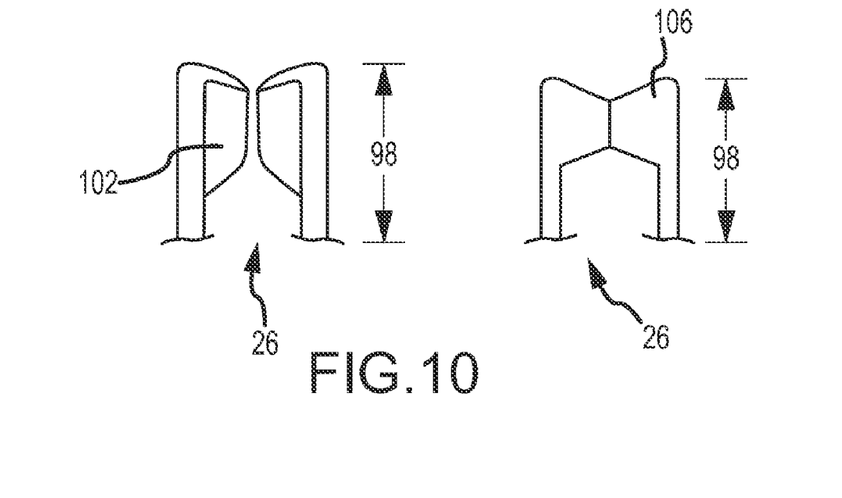
FIG. 10 is a front perspective view of alternative embodiments of a measuring rod of an internal glove sizing device.

Referring to FIG. 10, alternative embodiments of the measuring rod 26 are shown. As shown, the top of the measuring rod 98 may be designed as having a flat head 102 or as a thin sheet 106. Additionally, the top of a measuring rod 98 may be configured to measure a finger curve angle (not shown), that is the angle the fingers would naturally curve at in an ergonomic position. However, one skilled in the art will appreciate that the measuring rod 26 may be shaped and configured in numerous ways to fit within and measure various glove types. One skilled in the art will further appreciate that the measuring rod 26 may be interchangeable with other measuring rods designed to measure other internal dimensions or designed for specific glove types.

Referring again to FIG. 9, the housing 30 is comprised of a plurality of components that form a device capable of measuring internal dimensions of a glove 2. In embodiments of the present invention, the housing 30 provides a power supply interconnected to a "power on" button/switch 38 which initiates a sequence to provide power to the internal glove sizing device 22. In one embodiment, the power supply supplies electrical power. One skilled in the art will appreciate that the electrical power supply can be either alternating current ("AC") or direct current ("DC"). In one embodiment, the housing 30 is interconnected to a power cable 42 that interconnects with an electrical outlet to transmit and supply power to the housing 30. In one embodiment, the housing 30 also includes a "power off" button/switch 46 which initiates a sequence to terminate power to the internal glove sizing device 22. When the "power off" button/switch 46 is activated all of the settings/displays will clear. One skilled in the art will appreciate that in some embodiments, the power on 38 and power off 46 buttons/switches may be integrated into one power on/off button/switch. One skilled in the art will also appreciate that the internal glove sizing device 22 could employ other sources of power, such as battery, solar, or nuclear.

In one embodiment of the present invention, the housing 30 also employs an attachment mechanism (not shown) to temporarily secure the glove 2 on the measuring rod 26. One of skill in the art will appreciate that any number of attachment mechanisms, such as a clip, hook, or snap may be employed. One of skill in the art will also appreciate that other holding devices may be employed to hold the glove 2 on the measuring rod 26. One of skill in the art will additionally appreciate that the housing 30 may not include any additional attachment mechanisms. As such, the means for retaining a glove in a predetermined position on the internal glove sizing device 22 include, positioning on the measuring rod and/or attachment mechanisms, such as, clips, hooks, snaps, buckles, clamps, straps, hook and loop strips, etc.

In one embodiment of the present invention, the housing 30 further includes an adjusting knob 50 that is used to adjust the measuring rod 26 to a zero position. In one embodiment, the zero position occurs when both vertical members 34a and 34b of the measuring rod 26 are positioned together to reflect an internal distance or measurement of zero. In one embodiment, the adjusting knob 50 is manual and is physically interconnected to the measuring rod. However, one of skill in the art will appreciate that the adjusting knob 50 could also be automated or digital.

In one embodiment of the present invention, the housing 30 additionally includes a load unit 54. In a preferred embodiment, the internal glove sizing device 22 is capable of measuring the load in terms of mass and weight, i.e., metric (SI) units and United States customary units, grams and pounds, respectively. In one embodiment, the housing 30 provides kilogram (kg) and pound (lb) indicator buttons 58 and 62 so that the operator may choose which unit of measurement he or she wishes to use. Furthermore, in one embodiment, the load unit 54 utilizes a force gauge. However, one skilled in the art will appreciate that any force measuring device, such as a spring scale, or strain gauge, can be employed by the internal glove sizing device 22. The load unit 54 is capable of being pre-set to a specific load or tension (i.e., 5 lbs) by means of a load setting switch, dial or button 55. In one embodiment, the load unit 54 is interconnected to the measuring rod 26 so that once a specific load is set that load can be applied to the measuring rod 26.

In one embodiment, as a result of a load being applied to the measuring rod, the glove 2 expands and stretches until the predetermined load is reached. Once the predetermined load is reached, the glove 2 remains consistently stretched so that internal measurements of the glove 2 may be obtained. In embodiments of the present invention, a operator controls the amount of force or load applied to account for a glove's ability to stretch. One of skill in the art will appreciate that the load or force necessary to stretch a particular glove is due, at least partially, to its material. Thus, in embodiments of the present invention, the load unit 54 is capable of applying a wide range of loads in order to accommodate various glove material load requirements.

Likewise, in one embodiment of the present invention, the housing 30 includes a length unit 66. In a preferred embodiment, the internal glove sizing device 22 is capable of measuring the length both in terms of metric (SI) units and United States customary units, meters and inches, respectively. In one embodiment, the housing 30 provides centimeter (cm) and inch (in) indicator buttons 70 and 74 so that the operator may choose which unit of measurement he or she wishes to utilize. One skilled in the art will appreciate that many length measuring devices may be utilized in the present invention, such as, a plurality of rods, ruler, protractor, caliper, tape measure, gauge, load cell, strain gauge, laser, optical sensor, etc.

Importantly, in one embodiment, the housing 30 includes a load display 78 and a length display 82 which displays visual load and length information regarding internal glove dimensions. One skilled in the art will appreciate that many different output devices may be used to present load and length information for visual reception. The means for displaying information such as, load, length, and internal measurements include nixie tube displays, vacuum fluorescent displays (VF), light-emitting diode (LED) displays, liquid crystal displays (LCD), split-flap displays, flip-disc displays, split-disc displays, printers, projectors, and other electronic visual displays.

In one embodiment, a hold knob 86 is further provided. The hold knob 86 is interconnected with the length display 82 and enables an operator to hold the display reading by pushing or otherwise activating the hold knob 86. One skilled in the art will appreciate that other buttons or switches may be utilized to hold the length display 82 on the output or display devices 78 and 82 for a longer period of time.

Embodiments of the present invention may also include a computer and/or a printer device (not shown) for computing, storing, recording, displaying and printing the length and/or other display outputs. The means for recording at least one internal measurement include, tape drives, disk drives, ROM, RAM, flash memory, network servers, and other magnetic, optical, mechanical, and computer data storages devices/systems. It is envisioned that the internal glove sizing device 22 will be interconnected to a computer having the capacity to calculate, store, record, and compare various measurements and information. It is further envisioned that a printing device will either be connected directly to the internal glove sizing device 22 or connected to a computer in communication with the internal glove sizing device 22.

In one embodiment of the present invention, the housing 30 additionally includes "start" and "reset" buttons or switches 90 and 94. When activated, the start button 90 initiates a sequence to start the internal glove sizing device 22. The reset button 94 initiates a sequence to bring the measuring rod 26 back to its zero position. One of skill in the art will appreciate that many other buttons and switches may be included in the housing 30 depending on cost, complexity, etc.

In one embodiments of the present invention, the housing 30 employs a motor (not shown) to produce mechanical energy to move the vertical members 34*a* and 34*b* of the measuring rod 26 laterally apart from one another. One skilled in the art will appreciate that other mechanisms may be employed to move the vertical members 34*a* and 34*b*, such as an actuator.

Embodiments of the present invention also include means for inputting other data. For example, in one embodiment of the present invention, an operator is able to input the type of material that the glove 2 is made of or information regarding the stretchability of a glove or material. In other embodiments, an operator is able to input or upload one or more databases having glove dimension information. In these embodiments, the operator can compare an internal dimension of a glove with a database to determine whether the dimension is within a predetermined tolerance or limit. In still other embodiments, an operator is able to input dimension(s) of a specific end user or customer hands. The operator can then compare a glove's internal dimension(s) with that of the customer to ensure the size and fit of a custom glove. One skilled in the art will appreciate that these inputs may be input directly into the housing 30 or indirectly through a computer in communication with the internal glove sizing device 22.

Embodiments of the present invention further include means for applying a pre-determined load or amount of force in a cyclic or repeated fashion in order to test, verify and report on the durability and resiliency of a glove. For example, an operator can position a glove 2 on the internal glove sizing device 22 of one embodiment of the present application and then apply a predetermined amount of force for a predetermined number of times in order to test the glove for quality control purposes.

If the specifications for a given glove design require a specific amount or lack thereof of stretch it is imperative that the manufacturer have a quick and reliable method of and device for obtaining such information. Thus, in yet other embodiments of the present invention, the internal glove sizing device 22 has means to measure the amount of stretch, at one or more locations, in a particular glove.

In one embodiment of the present invention in order to obtain the palm width 6 of a glove 2, an operator first turns the power on to the internal glove sizing device 22 using the "power on" button 38. An operator then positions a glove 2 on the measuring rod 26 and optionally uses an attachment mechanism to temporarily secure the glove 2 to the housing 30. Next, an operator selects a unit of measurement (kg or lb) and inputs a load amount (i.e., 5 lb). An operator then triggers the "start" button 90 which activates the motor which applies the load to the measuring rod 26 and moves the vertical members 34*a* and 34*b* of the measuring rod 26 laterally apart from one another and consequently expands the glove 2 as the vertical members 34*a* and 34*b* move apart. The vertical members 34*a* and 34*b* continue to expand the glove 2 until the pre-set load (or tension) is reached. At that point the glove 2 is stretched to the set load and maintained in tension between the vertical members 34*a* and 34*b* of the measuring rod. The internal glove sizing device 22 then measures the distance between the two vertical members 34*a* and 34*b* and displays the measurement on the length display 82. The measurement may also be communicated to the operator via a voice command. The measurement may also be communicated to a computer, printing, or other display devices. If the operator desires to obtain another internal measurement he or she can press the "reset" button 94 and the motor will move the vertical members 34*a* and 34*b* back together so that they return to the original zero position. The operator will know the vertical members 34*a* and 34*b* have reached at the zero position when the length display 82 reads a length of zero.

Figure 11:
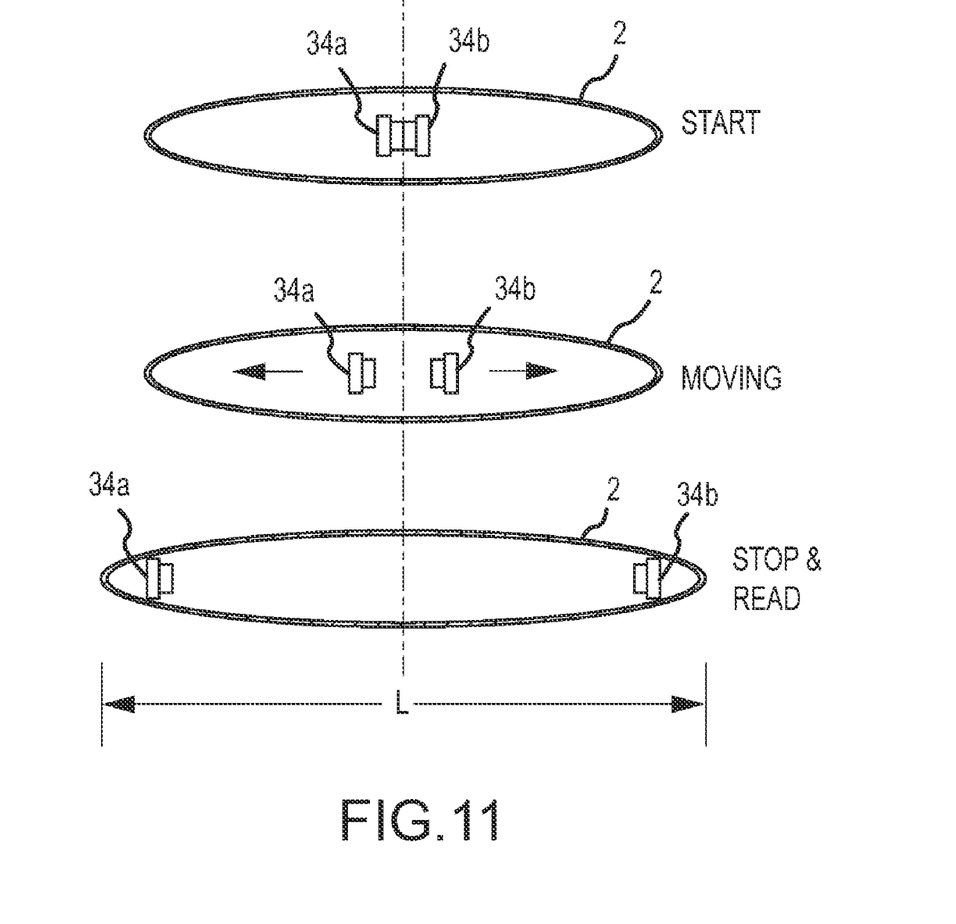
FIG. 11 is a cross-sectional view of a glove illustrating how an internal glove sizing device of one embodiment of the present invention measures a palm width.

Referring now to FIG. 11, a cross-sectional view of a glove 2 depicts how the internal glove sizing device 22 of one embodiment of the present invention measures a palm width 6. Initially, the measuring rod 26 is at its zero position, meaning the distance between the two vertical members 34*a* and 34*b* of the measuring rod 26 is zero. Once the motor is activated, the motor will move the vertical members 34*a* and 34*b* apart from one another until the pre-set load or tension is reached. Once the pre-set load is reached, the vertical members 34*a* and 34*b* stop and the distance between the two vertical members 34*a* and 34*b* is measured and thus provides an internal glove measurement.

One of skill in the art will appreciate that once the palm width 6 is known the circumference of the palm can be calculated. It is envisioned that the housing 30 and/or the computer will have computational capabilities such that once initial measurements are known a variety of other dimensions can be calculated, stored, recorded, printed, and displayed.

Figure 12:
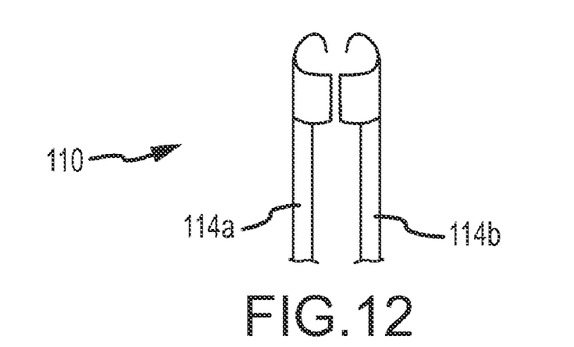
FIG. 12 is a front perspective view of a finger test rod of an internal glove sizing device of one embodiment of the present invention.
Figure 13:
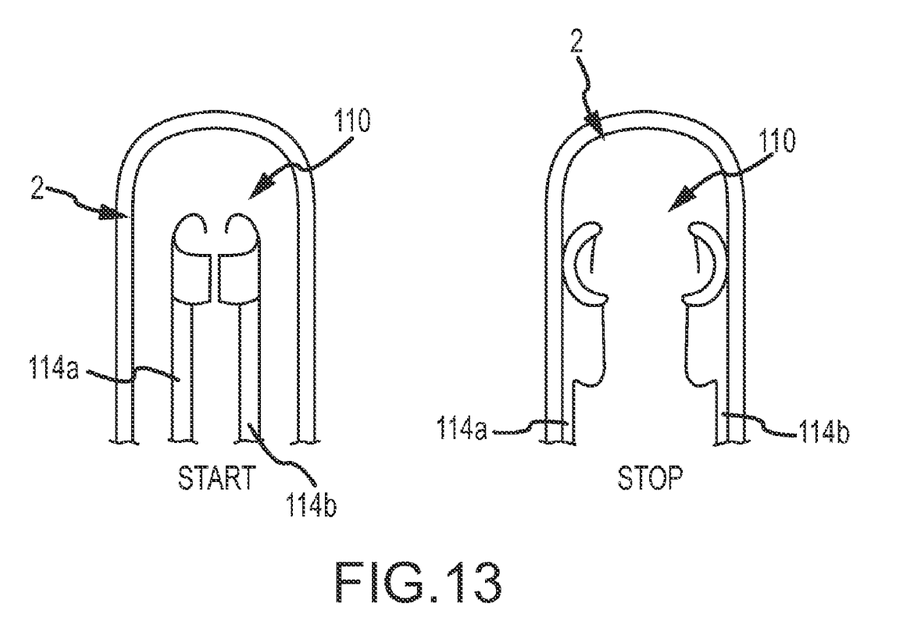
FIG. 13 is a cross-sectional view of a glove finger illustrating how a finger test rod of one embodiment of the present invention measures internal digit/finger width.

Referring now to FIGS. 12 and 13, a finger test rod 110 of one embodiment of the present invention is shown. The finger test rod 110 is used when an operator desires to obtain a digit (finger) tube width 14 measurement. The finger test rod 110 is capable of being used to measure all five digit tubes of a glove 2. The finger test rod 110 interconnects with the housing 30 of the internal glove sizing device 22. In the embodiment shown, the top portion of the finger test rod 110 is arcuate and sized to fit inside a digit or finger tube of a glove 2. Like the measuring rod 26 described above, the finger test rod 110 may include two vertical components 114*a* and 114*b* capable of moving laterally apart from one another. However, one skilled in the art will appreciate that one vertical component may be stationary (fixed) and the other vertical component may be moveable with respect to the stationary vertical component. Moreover, one skilled in the art will appreciate that the finger test rod 110 can be designed and configured in a variety of ways in order to obtain a digit tube width 14 measurement. One of skill in the art will also appreciate that the finger test rod 110 may be vertically curved in order to obtain a finger curve angle measurement.

Obtaining a finger/digit tube width 14 measurement using the internal glove sizing device 22 of the present invention is similar in operation to obtaining a palm width 6 (as described in detail above). To obtain a digit tube width 14 measurement, an operator interconnects the finger test rod 110 to the housing 30 and positions the desired glove finger tube on the finger test rod 110. The glove 2 may be temporarily secured to the housing 30 by an attachment mechanism. Once the operator turns the power on, by use of the "power on" button/switch 38, the operator selects and inputs a load amount and pushes the start button 90 to activate the motor. The vertical components 114*a* and 114*b* of the finger test rod 110 move apart and expand the glove finger until the pre-set load amount is reached. Once the load (or tension) amount is reached, the distance between the two vertical components 114*a* and 114*b* of the finger test rod 110 are measured, recorded and displayed on the length display 82 device. One of skill in the art will appreciate that once the digit width 14 measurement is known the circumference of the digit may also be calculated. One of skill in the art will also appreciate that the measuring rod 26 and/or finger test rod 110 can be sized and configured to measure a variety of other internal glove dimensions. Moreover, the operation of the internal sizing device of one embodiment of the present invention (described above) is capable of measuring finger length 10 and finger curve angle by using a measuring rod 26 configured to measure finger length 10 and finger curve angle, respectively.

While various embodiment of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. However, it is to be expressly understood that such modifications and alterations are within the scope and spirit of the present invention, as set forth in the following claims.

What is claimed is:

1. A glove sizing device adapted to measure at least one internal dimension of a glove, comprising:
   a means for retaining said glove in a predetermined position;
   a means for measurement which is adapted for insertion into a predetermined portion of the glove;
   a means for recording said at least one internal measurement; and
   a means for displaying the at least one internal measurement.

2. The glove sizing device of claim 1, wherein said means for retaining includes at least one of a clamp, clasp, hook, snap, hook and eye closure, buckle, hook and loop, tack, tie, or strap.

3. The glove sizing device of claim 1, wherein said means for measurement includes at least one of a plurality of rods, a ruler, a protractor, a caliper, a gauge, a load cell, a strain gauge, or a tape measure.

4. The glove sizing device of claim 1, wherein said means for recording includes at least one of a computer, a hard drive, a compact disc, a storage medium, or a person.

5. The glove sizing device of claim 1, wherein said means for displaying includes at least one of a summary report, a print out, a monitor, a nixie tube display, a vacuum fluorescent display, a light-emitting diode display, a liquid crystal display, a split-flat display, or a flip-disc display.

6. The glove sizing device of claim 1, further comprising a load unit for selecting a predetermined load, a length unit for displaying said internal dimension, and a motor for moving said means for measurement.

7. The glove sizing device of claim 1, wherein said internal dimension includes at least one of a length of a digit, a width of a palm, a circumference of a palm, a length of a hand, or a curve angle of a digit.

8. The glove sizing device of claim 1, wherein multiple internal dimensions of a glove are measured, recorded and displayed.

9. The glove sizing device of claim 1, further comprising a database which includes information related to the amount of stretch a material may have which is used in the construction of the glove.

10. The glove sizing device of claim 1, further comprising comparing the at least one internal dimension of the glove with a database and determining if the dimension is within a predetermined tolerance.

11. A method for measuring at least one internal dimension of a glove, comprising the steps of:
    providing at least one glove;
    providing a mechanism to securing said glove in a substantially stable position.
    inserting a measuring device into an internal portion of the glove to a predetermined position;
    measuring at least one predetermined location within said glove; and
    displaying a dimension of said at least one predetermined location.

12. The method of claim 11, wherein said mechanism to secure said glove comprises at least one of a clamp, clasp, hook, snap, hook and eye closure, buckle, hook and loop, tack, tie, or strap.

13. The method of claim 11, further comprising the step of inserting multiple measuring devices into the glove to measure multiple internal dimensions within the glove at distinct locations.

14. The method of claim 11, wherein the displaying a dimension step comprises displaying at least one dimension on a summary report, a print out, a monitor, a nixie tube display, a vacuum fluorescent display, a light-emitting diode display, a liquid crystal display, a split-flat display, or a flip-disc display.

15. The method of claim 11, further comprising the step of comparing the dimension of said at least one predetermined location with a database and determining if the dimension is within a predetermined tolerance.

16. The method of claim 11, further comprising the step of comparing said dimension of said at least one predetermined location with a dimension of a users hand.

17. The method of claim 11, further comprising the step of measuring the amount of stretch in the material used to fabricate the glove at one or more locations.

18. The method of claim 11, further comprising applying a predetermined force within the interior of a glove at a predetermined location to assure the glove will not inadvertently become unseamed or torn.

19. The method of claims 18, wherein said step of applying a predetermined force within an interior of the glove is repeated a predetermined number of times.

20. The method of claim 11, further comprising the step of comparing said dimension with a database of information to determine if the dimension is within a predetermined tolerance.

* * * * *